United States Patent
Maranchak et al.

[15] 3,670,240
[45] June 13, 1972

[54] METHOD FOR DETERMINING THE DISTANCE TO A FAULT ON POWER TRANSMISSION LINES AND DEVICE FOR ITS REALIZATION ON D.C. LINES

[72] Inventors: Vasily Makarovich Maranchak, Lefortousky val, 7/6, korpus 9, kv. 12; Vladimir Nikolaevich Novella, Utrennyaya ulitsa, 10, korpus 2, kv. 43; Stanislav Petrovich Veisky, ulitsa Lobanova, 4, kv. 36, all of Moscow, U.S.S.R.

[22] Filed: June 23, 1970

[21] Appl. No.: 49,025

[52] U.S. Cl. ............................................................ 324/52
[51] Int. Cl. .......................................................... G01r 31/08
[58] Field of Search ................................. 324/52; 179/175.3

[56] References Cited

UNITED STATES PATENTS

| | | | |
|---|---|---|---|
| 2,315,450 | 3/1943 | Nyquist.................................. | 324/52 |
| 2,717,992 | 9/1955 | Weintraub............................ | 324/52 X |
| 2,931,975 | 4/1960 | Bechtel.................................. | 324/52 |
| 2,493,800 | 1/1950 | Biskeborn............................. | 324/52 |
| 3,462,681 | 8/1969 | Biskup................................... | 324/52 |

*Primary Examiner*—Gerard R. Strecker
*Attorney*—Holman, Glascock, Downing & Seebold

[57] ABSTRACT

A method for determining the distance to a fault on power transmission lines from the time of propagation of electromagnetic waves along the line, in which at least at one point on the line the timer interval is measured between the instant of arrival of the leading edge of a wave occurring at the fault and propagated towards said point on the line around the loop formed by the line wires, and the instant of arrival of another wave occurring likewise at the fault and propagated towards said point around the loop formed by the line wires and earth, after which the distance to the fault is found as a function of the measured time interval.

A device for applying the above-disclosed method on d.c. power transmission lines, comprising a series combination of a wave-receiving unit connected to the power transmission line via voltage dividers and a time-interval measuring unit, with the wave-receiving unit incorporating at least two transformers whose primaries are connected via voltage dividers to the unlike poles of the power transmission line and whose corresponding secondaries are combined in pairs and connected via rectifiers to said time-interval measuring unit, with some secondaries being connected series-aiding so that they develop a signal proportional to the electromagnetic wave propagated from the fault around one of the two said loops and the remaining secondaries being connected in series opposition so that they develop a signal proportional to the electromagnetic wave propagated from the fault around the other loop.

3 Claims, 3 Drawing Figures

METHOD FOR DETERMINING THE DISTANCE TO A FAULT ON POWER TRANSMISSION LINES AND DEVICE FOR ITS REALIZATION ON D.C. LINES

The present invention is related to the field of power transmission, and more specifically to methods and devices for measuring the distance to a fault on power transmission lines.

There exist methods for measuring the distance to a fault on power transmission lines, which may arbitrarily be divided into two groups. One is based on measuring the electrical quantities at power frequency under steady-state fault condition. The other is based on measuring the time of travel of electromagnetic waves along the defective section of the line.

One of the disadvantages of the methods belonging to the first group is a long time of measurement, which fact makes their use different or even impossible on high-voltage lines where the fault duration may be shorter than the time required for the measurement. Another disadvantage of the methods in the first group is a large absolute error in determining the distance to a fault on long lines (over 400 km) because of variations in the zero-phase sequence impedance along the line, and also because of the effect of the contact resistance at the fault in such cases. Still another disadvantage of the methods in the first group is that they cannot be used on d.c. power transmission lines, since there is no power inflow at the fault from the inverter sub-station.

The second group of methods for determining the distance to a fault on power transmission lines includes the location method based on measuring the round-trip of electromagnetic waves along the defective section of the line, and the timing-signal method based on measuring the time of travel of the electromagnetic waves arising at the fault and travelling both ways from the fault, that is, towards the start and finish of the line.

A disadvantage of the location method is the necessity to use a generator to inject large-power pulses into the line in the case of a fault. Another disadvantage of the location method is the necessity to provide special r.f. traps on the line being served. Still another disadvantage of the location method is the requirement for much ancillary equipment and a heavy power drain on the supply source.

A further disadvantage of this method is the limited length of the lines that can be served, owing to marked impairment in the accuracy of measurement associated with the increased attenuation of the exploring pulses injected into the defective line.

A disadvantage of the timing-signal method is that time must be kept accurately or in synchronism at both points of measurement, which involves the use of a fast-response communication channel between the said points for the transmission of synchronizing signals.

Another disadvantage of this method is that the repetition frequency of the timing signals transmitted along the communication channel between the points where the time of travel of electromagnetic waves is measured must be maintained extremely stable.

There exist devices utilizing both groups of methods, notably devices to measure the distance to a fault on a.c. power transmission lines, which are instruments measuring electrical quantities (current and voltage) at power frequency (for example, 50 Hz) during a fault on the line being served, and also devices of the fault-locator type, comprising an exploring-pulse generator connected to the line being served via suitable filters, a unit to receive the exploring pulses reflected from the fault; and a unit to measure the time interval equal to the round-trip time of exploring pulses along the defective section of the line.

Besides, there exist devices to measure the distance to a fault on power transmission lines, comprising a timing-signal source set up at one end of the line being served, and two receivers for the electromagnetic waves propagated from the fault towards opposite ends of the line.

A disadvantage of the above-listed devices is either low accuracy in the case of instruments measuring electrical quantities at power frequency, or complexity and, as a consequence, low reliability in the case of devices measuring the time of travel of electromagnetic waves. Another disadvantage of the latter group of devices is the necessity to provide r.f. traps on the line and special pulse generators, because of which the cost of these devices is high. Still another disadvantage of the devices using timing signals is the necessity to provide between the line ends a communication channel whose operation may be upset by a fault on the line being served.

The aim of the present invention is to eliminate the above-listed disadvantages.

The objective of the invention is to provide a simple and reliable method for measuring the distance to a fault and a device for its realization.

This objective is accomplished by the act that in the method for determining the distance to a fault on a power transmission line from the time of travel of electromagnetic waves along the line according to the invention, the time interval is measured at least at one point on the line between the instant of arrival of the leading edge of an electromagnetic wave occurring at the fault and propagated towards the said point around the loop formed by the line wires, and the instant of arrival of the leading edge of another electromagnetic wave likewise occurring at the fault and propagated towards the said point around the loop formed by the line wires and earth, after which the distance to the fault is found as a function of this time interval, while in a device adapting the said method on d.c. lines and comprising a series combination of a wave-receiving unit connected via voltage dividers to the transmission line, and a time-interval measuring unit, the wave-receiving unit incorporates, according to the invention, at least two transformers whose primaries are connected via voltage dividers to the unlike poles of the transmission line, and whose respective secondaries are combined in pairs and connected via rectifiers to the said time-interval measuring unit, some of the secondaries being connected in series aiding so that they develop a signal proportional to the electromagnetic wave propagated from the fault around one of the said loops, and the remaining secondaries being connected in series opposition so that they develop a signal proportional to the electromagnetic wave propagated from the fault around the other loop.

It is preferable to provide capacitors connected in series with the transformer primaries.

The invention will be best understood from the following description of a preferred embodiment, when read in connection with the accompanying drawings wherein.

When a fault occurs on a power transmission lines, it gives rise to electromagnetic waves which are propagated both ways from the fault along the line. The waves take two paths (loops)—one loop is formed by the line wires alone, and the other loop is formed by the line wires and earth. In the loop formed by the line wires alone the electromagnetic wave (denoted $U_{n-n}$) has the velocity $V_{n-n}$ which is very near to that of light. In the loop formed by the line wires and earth, the electromagnetic wave (denoted $U_{n-3}$) has the velocity $V_{n-3}$ substantially lower than $V_{n-n}$.

Figure 1:
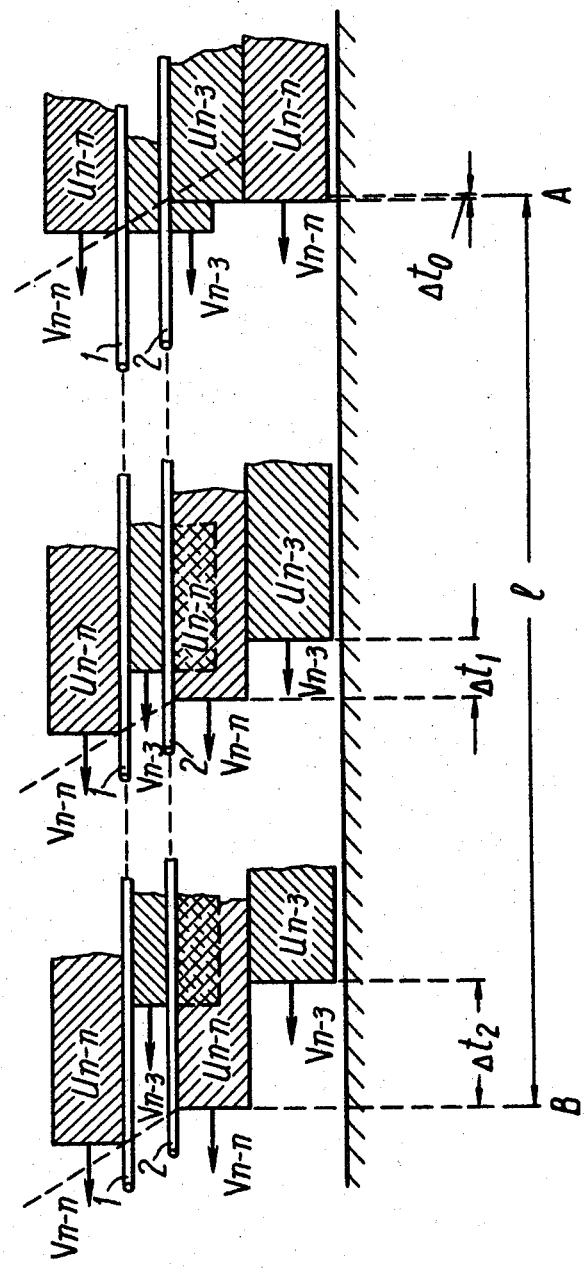
FIG. 1 shows diagrammatically the propagation of electromagnetic waves from a fault on a d.c. power transmission line towards a point of measurement.

Because of the difference in the velocities $V_{n-n}$ and $V_{n-3}$, the leading edge of the wave $U_{n-3}$ lags behind that of the wave $U_{n-n}$ by the time interval $\Delta t$, as the two waves advance from the fault along the line (FIG. 1).

The greater the distance $l$ from the fault (point A) to the point of measurement (point B), the greater the time interval $\Delta t$ ($\Delta t_2 > \Delta t_1 > \Delta t_o$).

Knowing $\Delta t$ as a function of the distance to the fault and measuring $\Delta t$ at least at one point on the line, it is possible to determine the distance $l$ to the fault.

The measured values of $\Delta t$ may vary according to the length of the line being served from 0 to $(3 \text{ to } 4) \times 10^{-3}$ seconds. In other words, the distance to a fault will be known in a few milliseconds from the beginning of the measurements.

Figure 2:
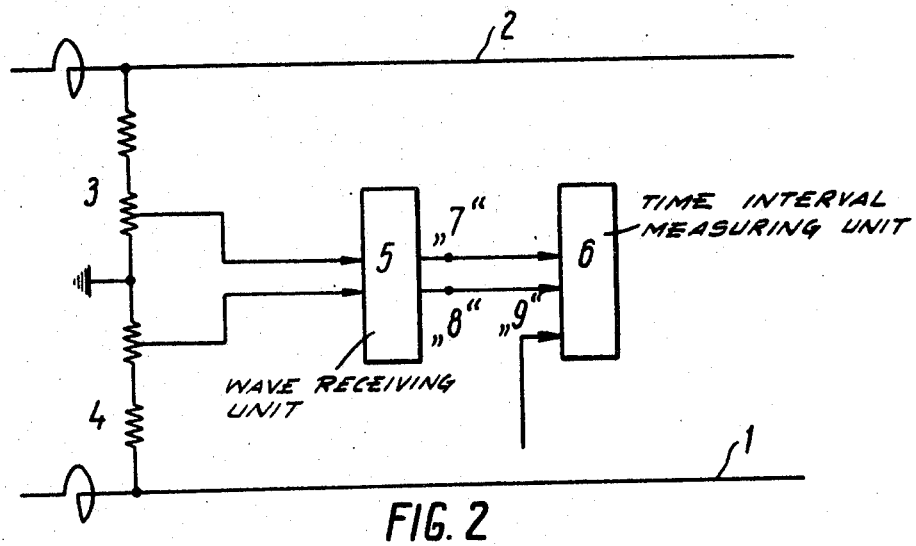
FIG. 2 is a block-diagram of a device to measure the distance to a fault, according to the invention.

A device adapting the disclosed method for measuring the distance to a fault on d.c. power transmission lines comprises a wave-receiving unit 5 connected to both poles 1 and 2 (FIG. 2) of the line being served via voltage dividers 3 and 4 and having its output connected to a time-interval measuring unit 6. The wave-receiving unit 5 serves to select signals occuring at the instants when the leading edges of the waves $U_{n-n}$ and $U_{n-3}$ arrive at the point of measurement B.

The function of the time-interval measuring unit 6 is to convert the time interval $\Delta t$ obtained by the unit 5 into a code (a number of pulses, the deflection of a meter, etc). One of the inputs (input 9) of the unit 6 is connected to the output of line-protective gear (omitted in the drawing). This connection is important so that readings of the unit 6 can be taken only when a fault has occurred on the line itself while no readings would be taken in all other cases of abnormal conditions on the line.

As follows from the skematic circuit, the wave-receiving unit 5 comprises two three-winding transformers 10 and 11 (FIG. 3) whose primaries 12 and 13 are connected via capacitors 14 and 15 to voltage dividers 3 and 4 of both poles 1 and 2 of the line being served and function as the inputs of the wave-receiving unit 5. The secondaries 16 and 17 are connected in series opposition and are coupled to a rectifier 20, while the secondaries 18 and 19 are connected in series-aiding and coupled to a rectifier 21. The output 7 of the rectifier 20 serves as the input 7 of the unit 6 (FIG. 2), and the output of the rectifier 21 is the input 8 of the unit 6.

The device disclosed herein operates as follows.

When a fault (for example, a short-circuit) occurs on one of the line poles (say, pole 2 FIG. 1), two electromagnetic waves are produced at that point (point A). One wave, $U_{n-n}$, is propagated towards the point of measurement B around the loop formed by the line wires (1 and 2) with a velocity $V_{n-n}$. The other wave, $U_{n-3}$, is propagated towards the point B around the loop formed by the line wires and earth with a velocity $V_{n-3}$.

At the instant when the wave $U_{n-n}$ arrives at point B, the instantaneous currents in the voltage dividers 3 and 4 (FIGS. 2 and 3) decrease in absolute value. This corresponds to the direction of an incremental current $\Delta I_{n-n}$ through the voltage dividers in the primary circuits 12 and 13 of the three-winding transformers 10 and 11 shown in FIG. 3. As a result, the voltage across the output 7 of the rectifier 20 is equal to the sum of the voltages across the secondaries 18 and 19 of the transformers 10 and 11, while the voltage across the output 8 of the rectifier 21 is zero. Thus, at the instant when wave $U_{n-n}$ arrives at point B, a signal appears only across one output of the wave-receiving unit 5 (output 7).

Figure 3:
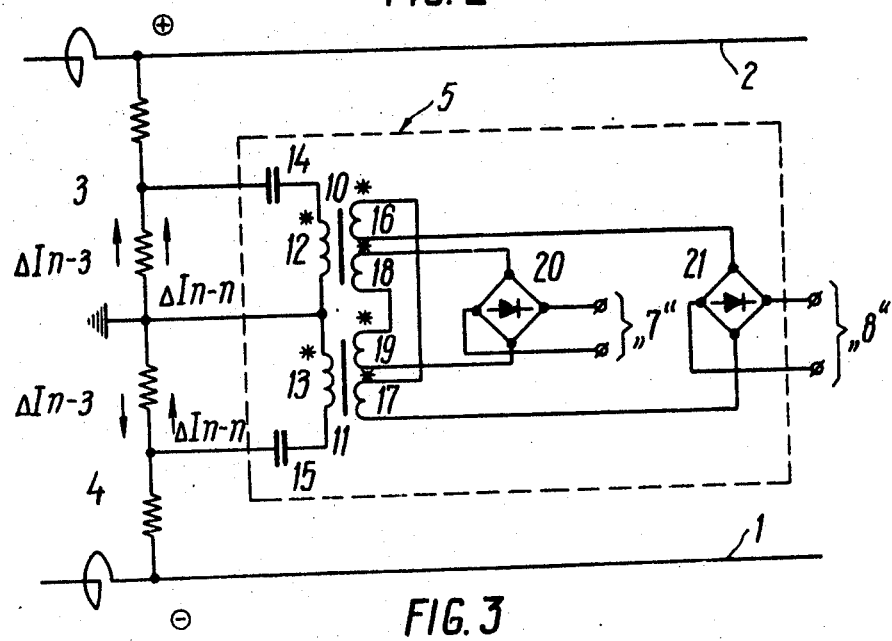
FIG. 3 is a circuit schematic of one embodiment of the wave-receiving unit in a device to measure the distance to a fault according to the invention.

The time interval $\Delta t_2$ (FIG. 1) later, the leading edge of the wave $U_{n-3}$ arrives at point B. Now an incremental current $\Delta I_{n-3}$ through one of the voltage dividers, as is seen from FIG. 3 is in the opposite direction to the incremental current $\Delta I_{n-n}$ through both voltage dividers. As a result, a signal appears across the output 8 of the rectifier 21, that is, across the other output of the wave-receiving unit 5. Thus, the signal across the output 8 appears the time $\Delta t_2$ (FIG. 1) after the signal across the output 7. This time interval $\Delta t_2$ is measured by the time-interval measuring unit 6 (FIG. 2) and, if the input 9 of the unit has accepted a signal from the line-protective gear, the result is used to determine the distance to the fault as a function of the measured time interval.

Thus, the invention disclosed herein, as compared with existing devices, offers higher reliability at lower cost, does not call for special ancillary apparatus and communication channels, has a higher speed of response, and can be used on power transmission lines of practically unlimited length to determine the distance to faults with a definite degree of accuracy.

What is claimed is:

1. A method of determining the distance to a fault in a high-tension d.c. transmission line according to the time of propagation of electromagnetic energy along the line by recording at one end of the line the moment corresponding to the arrival of the leading edge of an electromagnetic wave generated at the fault and propagating from the fault toward said end of the line along a loop formed by the wires of said line, recording at the same end of the line the moment corresponding to the arrival of the leading edge of the same electromagnetic wave generated at said fault and propagating from the fault toward said end of the line along a loop formed by the wires of said line and the earth; measuring the time interval between said moments, and computing the fault distance to said one end of the line as a function of the measured time interval.

2. A device for determining the distance to a fault in a high-tension d.c. transmission line, comprising: voltage dividers connected to the different poles of said line and functioning as voltage transmitters of voltages proportional to the instantaneous values of voltages across said poles of the line, and a unit receiving electromagnetic waves for detecting the two electrogamgnetic waves travelling along said loops from the fault, said unit comprising at least two transformers whose primary windings are connected to said voltage dividers, the respective secondary windings of said transformers being so combined in pairs that some of them are connected in series aiding and produce a signal proportional to the electromagnetic wave travelling from the fault toward said end of the line along one of said loops, while the remaining secondary windings are connected in series opposition and produce a signal proportional to the electromagnetic wave travelling from the fault toward said end of the line along the other of said loops; rectifiers, with the input of each of them connected to the respective pairwise-combined secondary windings of said transformers, making it possible to produce a signal of the same sign irrespective of the polarity of the electromagnetic wave travelling in one of said loops, and a time-interval measuring unit whose input is connected to the outputs of said rectifiers for measuring the difference in time of arrival of said electromagnetic waves.

3. A device as claimed in claim 2 comprising capacitors connected in series with the primary windings of said transformers to make sure that the result of measurements of said time interval does not depend on the level of the operating voltage in said high-tension d.c. transmission line.

* * * * *